US012803047B2

(12) United States Patent
Kim et al.

(10) Patent No.: US 12,803,047 B2
(45) **Date of Patent: *Nov. 17, 2026**

(54) FLEXIBLE SULFIDE SOLID ELECTROLYTE AND ALL SOLID-STATE BATTERIES COMPRISING THE SAME

(71) Applicant: Factorial Inc., Woburn, MA (US)

(72) Inventors: Hyun Seok Kim, Lexington, MA (US); Fang Hao, Andover, MA (US); Daniel Wakaba, Lawrence, MA (US); Toshinori Sugimoto, Woburn, MA (US); Jae Myung Lee, Belmont, MA (US)

(73) Assignee: Factorial Inc., Billerica, MA (US)

( * ) Notice: Subject to any disclaimer, the term of this patent is extended or adjusted under 35 U.S.C. 154(b) by 651 days.

This patent is subject to a terminal disclaimer.

(21) Appl. No.: 18/350,893

(22) Filed: Jul. 12, 2023

(65) Prior Publication Data

US 2024/0039043 A1 Feb. 1, 2024

Related U.S. Application Data

(60) Provisional application No. 63/390,699, filed on Jul. 20, 2022.

(51) Int. Cl.
*H01M 10/0562* (2010.01)
*H01M 10/0525* (2010.01)
(Continued)

(52) U.S. Cl.
CPC ... *H01M 10/0562* (2013.01); *H01M 10/0525* (2013.01); *H01M 50/42* (2021.01);
(Continued)

(58) Field of Classification Search
CPC ......... H01M 10/0562; H01M 10/0525; H01M 50/42; H01M 50/431; H01M 50/454;
(Continued)

(56) References Cited

U.S. PATENT DOCUMENTS

| | | | |
|---|---|---|---|
| 8,075,865 | B2 | 12/2011 | Deiseroth et al. |
| 9,812,734 | B2 | 11/2017 | Miyashita et al. |

(Continued)

FOREIGN PATENT DOCUMENTS

| | | | |
|---|---|---|---|
| CN | 106785011 | A | 5/2017 |
| KR | 20190050151 | A | 5/2019 |

(Continued)

OTHER PUBLICATIONS

Jan. 8, 2024 International search report (ISR) and written opinion (WO) for PCT/US23/70015.

(Continued)

*Primary Examiner* — Daniel H Lee

(57) ABSTRACT

This disclosure relates to a flexible membrane of sulfide solid electrolyte. In one embodiment, the flexible membrane has a bending strain of no less than 0.1%. In one embodiment, the flexible membrane has a lithium-ion conductivity of no less than 0.5 mS/cm. The bending strain is calculated according to the formula $\varepsilon_M = h/(2r)$, wherein h is thickness of the membrane and r is a bending radius corresponding to the membrane without any observable kinks, wrinkles, cracks, or damages.

19 Claims, 5 Drawing Sheets

(51) Int. Cl.

| | |
|---|---|
| ***H01M 50/42*** | (2021.01) |
| ***H01M 50/431*** | (2021.01) |
| ***H01M 50/454*** | (2021.01) |

(52) U.S. Cl.
CPC ....... *H01M 50/431* (2021.01); *H01M 50/454* (2021.01); *H01M 2300/0068* (2013.01); *H01M 2300/0085* (2013.01)

(58) Field of Classification Search
CPC . H01M 2300/0068; H01M 2300/0085; H01M 50/403; H01M 50/426; H01M 50/443; H01M 50/446; H01M 50/489; H01M 50/497; Y02E 60/10
See application file for complete search history.

(56) References Cited

U.S. PATENT DOCUMENTS

| | | | | |
|---|---|---|---|---|
| 11,024,876 | B2 | 6/2021 | Xu et al. | |
| 2020/0243808 | A1 | 7/2020 | Harutyunyan et al. | |
| 2022/0029242 | A1 * | 1/2022 | Hippauf .............. | H01M 4/0435 |
| 2022/0059870 | A1 | 2/2022 | Takahashi et al. | |
| 2022/0109182 | A1 | 4/2022 | Takahashi et al. | |
| 2023/0163353 | A1 | 5/2023 | Fujii et al. | |
| 2023/0352728 | A1 | 11/2023 | Ryu et al. | |

FOREIGN PATENT DOCUMENTS

| | | | |
|---|---|---|---|
| KR | 20210105505 | A | 8/2021 |
| WO | 2020252427 | A1 | 12/2020 |
| WO | 2021016319 | A1 | 1/2021 |

OTHER PUBLICATIONS

Sun Z, et. al., Insights on the Properties of the O-Doped Argyrodite Sulfide Solid Electrolytes (Li6PS5-x ClO x, x=0-1). ACS Applied Materials & Interfaces. Nov. 15, 2021;13(46):54924-54935.

Eckert H, et. al., Structural transformation of non-oxide chalcogenide glasses. The short-range order of lithium sulfide (Li2S)-phosphorus pentasulfide (P2S5) glasses studied by quantitative phosphorus-31, lithium-6, and lithium-7 high-resolution solid-state NMR. Chemistry of Materials. May 1990;2(3):273-279.

Chen X, Sun Q, Xie J, Huang C, Xu X, Tu J, Zhao X, Zhu T. Double-layer solid-state electrolyte enables compatible interfaces for high-performance lithium metal batteries. Journal of Energy Chemistry. 2022, 74: 91-99.

Kim DH, Lee YH, Song YB, Kwak H, Lee SY, Jung YS. Thin and flexible solid electrolyte membranes with ultrahigh thermal stability derived from solution-processable Li argyrodites for all-solid-state Li-ion batteries. ACS Energy Letters. 2020, 5(3):718-727.

Zhang Z, Wu L, Zhou D, Weng W, Yao X. Flexible sulfide electrolyte thin membrane with ultrahigh ionic conductivity for all-solid-state lithium batteries. Nano letters. 2021, 9;21(12):5233-9.

* cited by examiner

FLEXIBLE SULFIDE SOLID ELECTROLYTE AND ALL SOLID-STATE BATTERIES COMPRISING THE SAME

CROSS-REFERENCE

This application claims the benefit of U.S. Ser. No. 63/390,699, filed Jul. 20, 2022, the entire contents of which is hereby incorporated by reference in its entirety.

FIELD

This disclosure relates to a flexible sulfide solid electrolyte for all solid-state batteries.

BACKGROUND

All-solid-state batteries (ASSBs) have been attracting attention for their possibilities of better safety and higher energy density than conventional lithium-ion batteries which are based on organic liquid electrolytes. Among them, ASSBs comprising thiophosphate-based solid electrolytes (SEs) are promising because of their high ionic conductivities, good mechanical compatibility. The SE layer as substitute for the conventional liquid electrolyte interposes between cathode and anode. In addition, the SE layer functions as both electrolyte and separator, which allows transportation or flow of ions and prevents electronic contact between cathode and anode.

The general requirements for a solid electrolyte (SE) layer include: a) high ionic conductivity, b) good chemical/electrochemical stability against oxidation or reduction from its original phase, and c) physical/mechanical strength to prevent cathode and anode from direct or electronic contact, which usually results in catastrophic heat dissipation and fire or explosion.

Until now there is no or little study regarding the physical properties of thiophosphate SE layers. Mechanical flexibility is an important physical property of thiophosphate SE layers. An SE layer can be broken or cracked during a handling process. The defects and/or cracks may lead to electronic contact between cathode and anode.

The present disclosure provides a flexible thiophosphate SE layer which has less possibilities of crack and wrinkles even under at a high strain.

U.S. patent Ser. No. 11/024,876 B2 discloses a flexible composite membrane comprising a polymer porous support with pores filled by inorganic solid electrolyte. The flexibility of the composite membrane is due to the flexible polymer support. However, the use of polymer may have disadvantages such as low ion conductivity, low thermal stability, and poor safety due to its flammability.

WO 2021/016319 A1 discloses a stretchable and flexible lithium ion battery comprising a polymer based flexible electrolyte, wherein the electrolyte is selected from sodium (Na) super ionic conductor (NASICON), garnet, perovskite, lithium (Li) super ionic conductor (LISICON), lithium phosphorus oxynitride (LiPON), $Li_3N$, sulfide argyrodite, and anti-perovskite. It also discloses that polymer based thin electrolytes are feasible for achieving electrolytes that are shape conformable, flexible, and with high ionic conductivity. It does not provide any flexible inorganic electrolyte.

Eckert, Zhang and Kennedy have conducted thermomechanical optimization experiments for the $Li_2S$—$P_2S_5$ system and showed as a whole samples which do not have a single phase (Chem. of Mat. 1990, 2, 273-279). U.S. Pat. No. 8,075,865B2 discloses a single-phase lithium argyrodite. However, it does not disclose any mechanical properties or any method to prepare flexible SE. There remains a need for flexible SEs and solid-state batteries comprising the same.

SUMMARY

The present disclosure provides a flexible solid electrolyte layer based on argyrodite lithium ion conducting material. In one aspect, the flexibility of argyrodite SE layer is achieved by adjusting the ratio of bromine (Br) to chlorine (Cl). In another aspect, the flexibility of argyrodite SE layer is achieved by adjusting 1) Br/Cl ratio, 2) the polymer binder type, and/or 3) binder content in a mixture such as slurry.

This disclosure provides a flexible membrane of sulfide solid electrolyte. In one embodiment, the sulfide solid electrolyte is an argyrodite. In one embodiment, the flexible membrane has a bending radius of no more than 4 cm. In one embodiment, the flexible membrane has a bending strain of no less than 0.1%.

Definitions and Abbreviations

The following terms shall be used to describe the present disclosure. In the absence of a specific definition set forth herein, the terms used to describe the present disclosure shall be given their common meaning as understood by those of ordinary skill in the art.

As used herein, "bending radius" is a parameter characterizing the flexibility of a material and is representatively measured by the radius corresponding to the bent or curved sheet or membrane sample when it can be bent without causing any observable damage (Kim T, et al., "Bending Strain and Bending Fatigue Lifetime of Flexible Metal Electrodes on Polymer Substrates," Materials 2019, 12, 2490). Observable damage may include cracks, kinks, or wrinkles. In one embodiment, the sheet or membrane has a thickness of 10-200 μm. In one embodiment the sheet or membrane has a width or length of 3.0 to 10 cm. In one embodiment, the sheet or membrane is a 5.4 cm×5.4 cm square sheet with a thickness of 90 μm. In one embodiment, a bending strain may also be used to measure the bendability or flexibility of a layer or membrane. In one embodiment, the bending strain ($\varepsilon_M$) is representatively calculated by the mostly commonly used monolayer model and can be measured by the following formula (Kim T, et al., "Bending Strain and Bending Fatigue Lifetime of Flexible Metal Electrodes on Polymer Substrates," Materials 2019, 12, 2490):

$$\varepsilon_M = h/(2r),$$

where h is thickness of the sample, r is the minimum bending radius without causing any damage (for example, cracks, wrinkles, or kinks).

A higher value of $\varepsilon_M$ indicates a better flexibility.

DETAILED DESCRIPTION

Figure 1A:
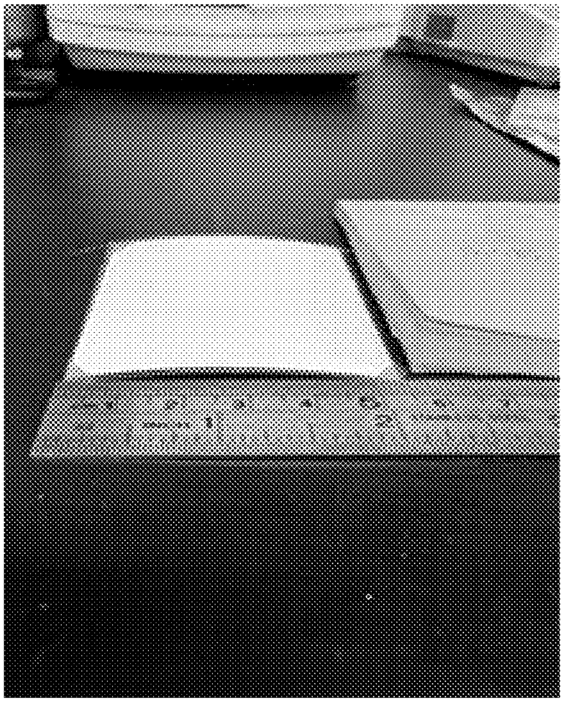
FIG. 1A through 1D show representative measurements of the bending radius by using a solid electrolyte membrane with a size of 5.4 cm×5.4 cm and a thickness of 90 μm.

In one embodiment, the present disclosure provides a flexible electrolyte membrane of sulfide solid electrolyte with a compound represented by Formula I and having an argyrodite-type crystal structure: $Li_xM1_yM2_zP_{1-p}M3_pS_{6-a-b-q}O_qCl_aBr_b$ (Formula I), wherein $4\leq x\leq 8$, $0\leq y<1$, $0\leq z<1$, $0\leq p<1$, $0\leq q<1$, $0<a\leq 2$, $0\leq b<2$, $0<6-a-b-q<6$, $0<1-p\leq 1$, $0\leq b/a\leq 3.5$, and wherein M1 is at least one element of Group 1 or Group 11 other than H or Li of the periodic table, M2 is at least one element of Group 2 of the periodic table, and M3 is at least one element of Group 14 of the periodic table.

In one embodiment, the flexible electrolyte membrane as disclosed in the present disclosure has a cubic crystal structure. In one embodiment, the electrolyte has a crystal structure in the $F\bar{4}3m$ space group as verified by XRD.

In one aspect, the present disclosure provides a flexible electrolyte membrane of sulfide solid electrolyte with a formula: $Li_xM1_yM2_zP_{1-p}M3_pS_{6-a-b-q}O_qCl_aBr_b$ (Formula I), wherein $4\leq x\leq 8$, $0\leq y<1$, $0\leq z<1$, $0\leq p<1$, $0\leq q<1$, $0<a\leq 2$, $0\leq b<2$, $0<6-a-b-q<6$, $0<1-p\leq 1$, $0\leq b/a\leq 7$, and wherein M1 is at least one element of Group 1 or Group 11 other than H or Li of the periodic table, M2 is at least one element of Group 2 of the periodic table, and M3 is at least one element of Group 14 of the periodic table.

In one embodiment, the flexible electrolyte membrane has a bending strain ($\varepsilon_M$) of no less than 0.1%, wherein the bending strain is calculated according to the formula:

$$\varepsilon_M=h/(2r),$$

where h is thickness of the membrane and r is a bending radius achieved without observable damage (such as cracks, wrinkles, or kinks) to the membrane.

In one embodiment, the flexible electrolyte membrane has a thickness in a range from 5 μm to 300 μm, from 10 μm to 300 μm, from 20 μm to 300 μm, from 50 μm to 300 μm, from 2 μm to 500 μm, from 5 μm to 500 μm, from 10 μm to 500 μm, from 10 μm to 500 μm, from 20 μm to 500 μm, from 50 μm to 500 μm, or any and all ranges and subranges therebetween.

In some embodiments, the electrolyte membrane has a lithium-ion conductivity of no less than 0.02 mS/cm, no less than 0.05 mS/cm, no less than 0.1 mS/cm, no less than 0.2 mS/cm, no less than 0.5 mS/cm, or no less than 1 mS/cm. In some embodiments, the flexible electrolyte membrane has a lithium-ion conductivity in a range from 0.05 mS/cm to 10 mS/cm, from 0.1 mS/cm to 10 mS/cm, from 0.25 mS/cm to 10 mS/cm, from 0.5 mS/cm to 10 mS/cm, from 0.75 mS/cm to 10 mS/cm, 0.05 mS/cm to 20 mS/cm, from 0.1 mS/cm to 20 mS/cm, from 0.25 mS/cm to 20 mS/cm, from 0.5 mS/cm to 20 mS/cm, from 0.75 mS/cm to 20 mS/cm, 0.05 mS/cm to 50 mS/cm, from 0.1 mS/cm to 50 mS/cm, from 0.25 mS/cm to 50 mS/cm, from 0.5 mS/cm to 50 mS/cm, from 0.75 mS/cm to 50 mS/cm, or any and all ranges and subranges therebetween.

In some embodiments, the electrolyte membrane has a bending strain of no less than 0.1% and a lithium-ion conductivity of no less than 0.02 mS/cm. In some embodiments, the electrolyte membrane has a bending strain of no less than 0.1% and a lithium-ion conductivity of no less than 0.05 mS/cm. In some embodiments, the electrolyte membrane has a bending strain of no less than 0.1% and a lithium-ion conductivity of no less than 0.1 mS/cm. In some embodiments, the electrolyte membrane has a bending strain of no less than 0.1% and a lithium-ion conductivity of no less than 0.2 mS/cm. In some embodiments, the electrolyte membrane has a bending strain of no less than 0.1% and a lithium-ion conductivity of no less than 0.5 mS/cm. In some embodiments, the electrolyte membrane has a bending strain of no less than 0.1% and a lithium-ion conductivity of no less than 0.55 mS/cm. In some embodiments, the electrolyte membrane has a bending strain of no less than 0.1% and a lithium-ion conductivity of no less than 0.60 mS/cm. In some embodiments, the electrolyte membrane has a bending strain of no less than 0.1% and a lithium-ion conductivity of no less than 0.65 mS/cm. In some embodiments, the electrolyte membrane has a bending strain of no less than 0.1% and a lithium-ion conductivity of no less than 0.7 mS/cm.

In one embodiment, the formula of the sulfide electrolyte comprises at least one element selected from the group consisting of M1, M2, M3 and O. In some embodiments, the Formula (I) contains one element selected from the group consisting of M1, M2, M3 and O. In some embodiments, the formula I is selected from the group consisting of:

1) $Li_xPS_{6-a-b-q}O_qCl_aBr_b$, where $4\leq x\leq 8$, $0<q\leq 1$, $0<a\leq 2$, $0\leq b<2$, $0<6-a-b-q<6$;
2) $Li_xM1_yPS_{6-a-b}Cl_aBr_b$, where $4\leq x\leq 8$, $0<y<1$, $0<a\leq 2$, $0\leq b<2$, $0<6-a-b<6$;
3) $Li_xM2_zPS_{6-a-b}Cl_aBr_b$, where $4\leq x\leq 8$, $0<z\leq 1$, $0<a\leq 2$, $0\leq b<2$, $0<6-a-b<6$; and
4) $Li_xP_{1-p}M3_pS_{6-a-b}Cl_aBr_b$, where $4\leq x\leq 8$, $0<p\leq 1$, $0\leq a\leq 2$, $0\leq b<2$, $0<6-a-b<6$, $0<1-p<1$.

In some embodiments, the molar amount of Br in the formula has a value higher than zero, i.e., b>0.

In some embodiments, M1 is at least one element of Group 1 or Group 11 other than H or Li of the periodic table. In some embodiments, M1 is at least one selected from the group consisting of Na, K, Rb, Cs, Cu, Ag, and Au. In some embodiments, M1 is selected from the group consisting of Na, Cu and Ag. In some embodiments, M2 is at least one element of Group 2 of the periodic table. In some embodiments, M2 is at least one selected from the group consisting of Be, Mg, Ca, Sr, and Ba. In some embodiments, M3 is at least one element of Group 14 of the periodic table. In some embodiments, M3 is at least one selected from the group consisting of Si, Ge, Sn, and Pb.

The incorporation of oxygen into the formula makes such material more stable and/or less sensitive to oxygen or water. In one embodiment, when the formula is $Li_xPS_{6-a-b-q}O_qCl_aBr_b$, where $4\leq x\leq 8$, $0<q\leq 1$, $0<a\leq 2$, $0\leq b<2$, $0<6-a-b-q<6$, the molar amount of 0 with q having a value in a range from 0 to 0.1, from 0 to 0.2, from 0 to 0.3, from 0 to 0.4, from 0 to 0.5, from 0 to 0.6, from 0.001 to 0.1, from 0.001 to 0.2, from 0.001 to 0.3, from 0.001 to 0.4, from 0.001 to 0.5, from 0.001 to 0.6, from 0.002 to 0.1, from 0.002 to 0.2, from 0.002 to 0.3, from 0.002 to 0.4, from 0.002 to 0.5, from 0.002 to 0.6, from 0.005 to 0.1, from 0.005 to 0.2, from 0.005 to 0.3, from 0.005 to 0.4, from 0.005 to 0.5, from 0.005 to 0.6, or any and all ranges and subranges therebetween. In one embodiment, the formula is $Li_{5.8}PS_{4.7}O_{0.1}Cl_{1.2}$. In one embodiment, the formula is $Li_xPS_{6-a-b-q}O_qCl_aBr_b$, wherein $4\leq x\leq 8$, $0<q\leq 1$, $0<a\leq 2$, $0<b<2$, $0<6-a-b-q<6$. In some embodiments, b/a has a value in a range from 0 to 3.5. In some embodiments, b/a has a value in a range from 0 to 7. In some embodiments, b/a has a value in a range from 0 to 10, from 0 to 15, or from 0 to 20. In some embodiments, b/a has a value higher than zero.

In one embodiment, when the formula is $Li_xM1_yPS_{6-a-b-q}Cl_aBr_b$, 4≤x≤8, 0<y<1, 0<a≤2, 0≤b<2, 0<6−a−b<6, b/a has a value in a range from 0 to 3.5. In some embodiments, b/a has a value in a range from 0 to 7. In some embodiments, b/a has a value in a range from 0 to 10, from 0 to 15, or from 0 to 20. In some embodiments, b/a has a value higher than zero.

In one embodiment, when the formula is $Li_xM2_zPS_{6-a-b}Cl_aBr_b$, where 4≤x≤8, 0<z≤1, 0<a≤2, 0≤b<2, 0<6−a−b<6, b/a has a value in a range from 0 to 3.5. In some embodiments, b/a has a value in a range from 0 to 7. In some embodiments, b/a has a value in a range from 0 to 10, from 0 to 15, or from 0 to 20. In some embodiments, b/a has a value higher than zero.

In one embodiment, when the formula is $Li_xP_{1-p}M3_pS_{6-a-b}Cl_aBr_b$, 4≤x≤8, 0<p≤1, 0<a≤2, 0≤b<2, 0<6−a−b<6, 0<1−p<1, b/a has a value in a range from 0 to 3.5. In some embodiments, b/a has a value in a range from 0 to 7. In some embodiments, b/a has a value in a range from 0 to 10, from 0 to 15, or from 0 to 20. In some embodiments, b/a has a value higher than zero.

In some embodiments, the Formula (I) contains 0 and one element selected from the group consisting of M1, M2, and M3. In some embodiments, the sulfide solid electrolyte has a formula selected from the group consisting of $Li_xM1_yPS_{6-a-b-q}O_qCl_aBr_b$ (4≤x≤8, 0<y<1, 0<q<1, 0<a≤2, 0≤b<2, 0<6−a−b−q<6), $Li_xM2_zPS_{6-a-b-q}O_qCl_aBr_b$ (4≤x≤8, 0<z<1, 0≤q<1, 0<a≤2, 0≤b<2, 0<6−a−b−q<6), and $Li_xP_{1-p}M3_pS_{6-a-b-q}O_qCl_aBr_b$ (4≤x≤8, 0<p<1, 0<q<1, 0<a≤2, 0≤b<2, 0<6−a−b−q<6, 0<1−p<1). In one embodiment, the Formula (I) contains 0 without M1, M2, or M3. In one embodiment, the formula of the sulfide electrolyte is $Li_xPS_{6-a-b-q}O_qCl_aBr_b$ (4≤x≤8, 0≤q<1, 0<a≤2, 0≤b<2, 0<6−a−b−q<6). In some embodiments, the molar amount of Br in the formula has a value higher than zero, i.e., b>0.

In one embodiment, the total molar amount of the halogen in the formula of sulfide electrolyte is no more than 2, i.e., a+b≤2. In one embodiment, the total molar amount of the halogen in the formula is no less than 2 and no more than 3, i.e., 2<a+b≤3. In one embodiment, the total molar amount of the halogen in the formula is no less than 2 and less than 4, i.e., 2≤a+b≤4. In one embodiment, the total molar amount of Br and Cl in the formula is no more than 2, i.e., a+b≤2. In one embodiment, the total molar amount of Br and Cl in the formula is no less than 2 and no more than 3, i.e., 2≤a+b≤3. In one embodiment, the total molar fraction of Br and Cl in the formula is no less than 2 and less than 4, i.e., 2≤a+b<4.

In one embodiment, the sulfide solid electrolyte has a formula selected from the group consisting of: $Li_{5.8}PS_{4.7}O_{0.1}Cl_{1.2}$, $Li_{5.9}P_{0.9}Ge_{0.1}S_{4.8}Cl_{1.2}$, $Li_{5.7}Na_{0.1}PS_{4.8}Cl_{1.2}$, $Li_{5.4}PS_{4.4}Cl_{0.4}Br_{1.2}$, $Li_{5.8}PS_{4.8}Cl_{0.4}Br_{0.8}$, $Li_{5.4}PS_{4.4}Cl_{0.6}Br_{1.0}$, $Li_{5.4}PS_{4.4}Cl_{0.8}Br_{0.8}$, $Li_{5.4}PS_{4.4}Cl_{0.8}Br_{0.8}$, $Li_{5.8}PS_{4.8}Cl_{0.6}Br_{0.6}$, $Li_{5.4}PS_{4.4}Cl_{1.0}Br_{0.6}$, $Li_{5.4}PS_{4.4}Cl_{1.2}Br_{0.4}$, $Li_{5.8}PS_{4.8}Cl_{0.8}Br_{0.4}$, $Li_{5.8}PS_{4.8}Cl_{1.0}Br_{0.2}$, and $Li_{5.4}PS_{4.4}Cl_{1.4}Br_{0.2}$.

In some embodiments, the flexible SE membrane comprises a binder with a percentage in a range from 0.02 wt % to 5 wt %, from 0.02 wt % to 10 wt %, from 0.02 wt % to 15 wt %, from 0.02 wt % to 20 wt %, from 0.05 wt % to 5 wt %, from 0.05 wt % to 10 wt %, from 0.05 wt % to 15 wt %, from 0.05 wt % to 20 wt %, from 0.1 wt % to 5 wt %, from 0.1 wt % to 10 wt %, from 0.1 wt % to 15 wt %, from 0.1 wt % to 20 wt %, from 0.2 wt % to 5 wt %, from 0.2 wt % to 10 wt %, from 0.2 wt % to 15 wt %, from 0.2 wt % to 20 wt %, from 0.5 wt % to 5 wt %, from 0.5 wt % to 10 wt %, from 0.5 wt % to 15 wt %, from 0.5 wt % to 20 wt %, from 1 wt % to 5 wt %, from 1 wt % to 10 wt %, from 1 wt % to 15 wt %, from 1 wt % to 20 wt %, or any ranges and subranges therebetween.

In one aspect, the present disclosure provides an all solid-state battery comprising the flexible electrolyte membrane as disclosed herein.

In one embodiment, the all solid-state battery further comprises a cathode comprising a cathode electroactive material.

In one embodiment, the cathode active material shows a redox reaction at a potential of 2 V or more on a lithium electrode basis during operation of the all solid-state battery.

In one embodiment, the cathode active material contains Li, Ni, and Co. In one embodiment, the cathode active material contains Li, Ni, and Co and at least one of Mn and Al.

In one embodiment, the cathode active material contains at least one of Fe, and P.

In one embodiment, the all solid-state battery further comprises a positive electrode layer containing a positive electrode active substance and negative electrode layer, wherein the flexible electrolyte membrane is arranged between the positive electrode layer and the negative electrode layer.

In one embodiment, the negative electrode layer comprises particles of a carbon-based conductive material with at least one selected from the group consisting of carbon black, acetylene black, Ketjen black, channel black, furnace black, lamp black, thermal black, natural graphite and artificial graphite.

In one embodiment, the negative electrode layer comprises a metal with at least one selected from the group consisting of lithium, sodium, magnesium, aluminum, silicon, calcium, titanium, manganese, iron, cobalt, nickel, zinc, molybdenum, silver, indium, tin, and tungsten.

In one aspect, the flexibility of the electrolyte membrane or layer disclosed herein is not solely due to the polymer porous support layer (a scaffold layer). To rule out the influence of the polymer porous support layer on the flexibility, the same polymer porous support was used in all examples in Table 1 so as to investigate other factors such as Br/Cl ratio, polymer binder type, and polymer binder content.

In one aspect, the present disclosure provides a method for preparing the flexible electrolyte membrane via a wet method or a dry method. In one embodiment, a wet method may comprise:

1) mixing particles of the sulfide electrolyte with Formula (I), a binder and a solvent, resulting in a slurry;
2) coating the slurry on a base followed by a vacuum drying at room temperature, wherein the base comprises a film and a non-woven fabric, leading to a dried coating attached to the non-woven fabric; and
3) peeling the dried coating with the non-woven fabric from the film, thereby obtaining an electrolyte membrane.

In one embodiment, when the slurry is applied to the non-woven fabric of the base, the pores of the non-woven fabric is filled with the mixture containing the particles, binder and the solvent. Once a dried coating is formed after the solvent is substantially removed, the non-woven fabric is attached to the electrolyte layer and forms a part of the electrolyte layer.

In one embodiment, the particles of the sulfide electrolyte are prepared by mixing raw precursor powders at a stoichiometric ratio in an inert atmosphere, followed by sintering at 400-700° C. for 4-24 hours and grinding. In some embodiments, the raw precursor powders comprise $Li_2S$, $Na_2S$, $P_2S_5$, LiCl, LiBr, $Li_2O$, and $GeS_2$.

In one embodiment, the binder for the wet method may be a non-aqueous acrylate-type binder, a rubber-type binder such as styrene-butadiene rubber (SBR), nitrile butadiene rubber (NBR), poly(vinylidene fluoride) (PVDF), polyethylene (PE), vinylidene fluoride/hexafluoropropylene copolymer, polyvinylidene fluoride-co-trichloroethylene, polyacrylonitrile, polymethylmethacrylate, polyvinylpyrrolidone, polyvinylacetate, polyethylene-co-vinyl acetate, polyethylene oxide, polyarylate, cellulose acetate, cellulose acetate butyrate, cellulose acetate propionate, polysaccharide polymer and carboxyl methyl cellulose, or a combination thereof.

In one embodiment, the solvent comprises xylene.

In one embodiment, the particles, the binder and the solvent are mixed in a planetary centrifugal mixer.

In one embodiment, the film in the base is a PET film. In one embodiment, the non-woven fabric functions as a scaffold layer or a mechanical support layer. In one embodiment, the non-woven fabric is made of a polyester. Nonlimiting specific polyester includes polyethylene terephthalate (PET). In some embodiments, the non-woven fabric has a thickness around 7.5 μm, around 10 μm, around 12 μm, around 15 μm, around 17 μm, or around 20 μm.

In some embodiments, the non-woven fabric has a porosity around 70%, 73%, around 75%, around 78%, around 80%.

In some embodiments, the method further comprises peeling off the dried coating with the scaffold layer from the film.

In another embodiment, a representative dry method may comprise:

1) mixing particles of the sulfide electrolyte with Formula (I) with a binder, resulting in a mixture; and
2) shaping the mixture into an electrolyte membrane.

In some embodiments, the binder is a fibrillizable binder. In some embodiments, the fibrillizable binders include polytetrafluoroethylene (PTFE), ultrahigh molecular weight (UHMW) polyethylene (PE) and a combination thereof. In some embodiments, the particles and the binder are mixed at a temperature below the melting point of the binder and sufficient to soften the binder. In some embodiments, the temperature is in a range from 70° C. to 300° C., from 80° C. to 300° C., from 90° C. to 300° C., from 100° C. to 300° C., from 110° C. to 300° C., from 120° C. to 300° C., from 130° C. to 300° C., from 150° C. to 300° C., or all and any ranges and subranges therebetween.

In some embodiments, the mixture is shaped into an electrolyte membrane by calendaring. In one embodiment, the calendaring is performed on a roller.

The disclosure will be better understood by reference to the Experimental Details which follow, but those skilled in the art will readily appreciate that the specific experiments detailed are only illustrative and are not meant to limit the disclosure as described herein, which is defined by the claims which follow thereafter.

It is to be noted that the transitional term "comprising", which is synonymous with "including", "containing" or "characterized by", is inclusive or open-ended and does not exclude additional, un-recited elements or method steps.

EXAMPLES

Synthesis of Solid Electrolyte Materials

In a glove box having an inert Ar atmosphere, raw precursor powders were prepared at a stoichiometric ratio. The precursor examples include, but are not limited to, $Li_2S$, $Na_2S$, $P_2S_5$, LiCl, LiBr, $Li_2O$, $GeS_2$, any combinations thereof. These powders were ball milled with a planetary ball miller for 4 hours. Subsequently, these powders were sintered at 450° C. for 12 hours.

Thereby, solid electrolyte materials with argyrodite-type structure were obtained. After a grinding procedure, solid electrolyte particles have an average particle size in a range from 1 to 10 μm and will be used for slurry preparation.

Preparation of Solid Electrolyte Slurry

Solid electrolytes, binder, solvent, and Zirconia milling medias were mixed using a planetary centrifugal mixer. The binder includes but is not limited to PTFE, rubber type binder, for example SBR, and non-aqueous acrylate-type binder. The solvent includes but is not limited to xylene.

Preparation of Solid Electrolyte Membrane

In a dry room with dew point below −50° C., the obtained solid electrolyte slurry was coated on a release polyethylene terephthalate film (50 μm) using a doctor blade and then the film was dried in a vacuum oven at room temperature overnight. A non-woven fabric was used as a scaffold layer to provide necessary mechanical support for this self-standing solid electrolyte layer. The thickness of the produced solid electrolyte layer was ~90 μm. The solid electrolyte layer was cut into a membrane with a size of 5.4 cm×5.4 cm for tests.

Characterizations and Tests of Solid Electrolyte Membrane

Powder X-ray diffraction (XRD) measurement was performed using an X-ray diffractometer (SmartLab, Rigaku) with Cu-Kα radiation. Diffraction data were collected in steps of 0.05° over a 2θ range of 5-60° at a scan rate of 3° $min^{-1}$. XRD measurements were performed using an airtight container to prevent air exposure to the electrolyte powder. For Ionic conductivity: SE membranes were first punched into a disc with diameter of 1.2 cm, and pressed in a torque cell (PEEK) with stacking pressure of 375 MPa. Titanium plungers were used as current collectors. Ionic conductivities of solid electrolyte membrane were measured by electrochemical impedance spectroscopy (EIS) were collected in the range from 1 Hz to 7 MHz using a potentiostat (SP200, Biologic) with an applied AC voltage of 10 mV. All measurements were performed at room temperature.

Figure 1B:
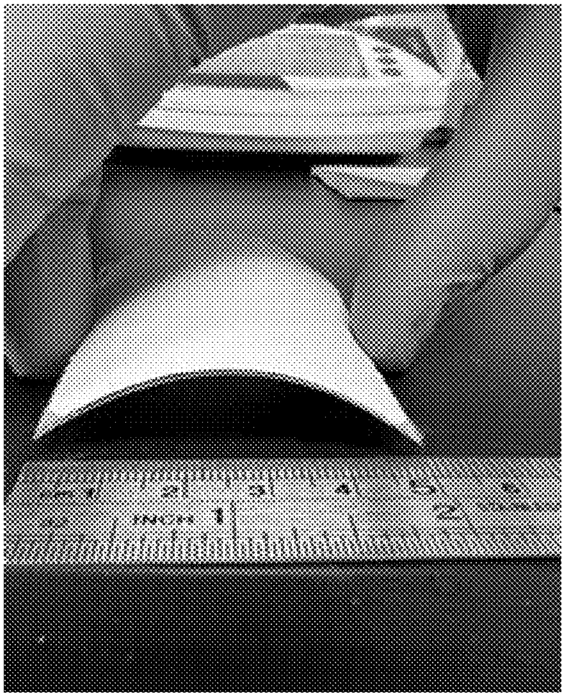
Figure 1C:
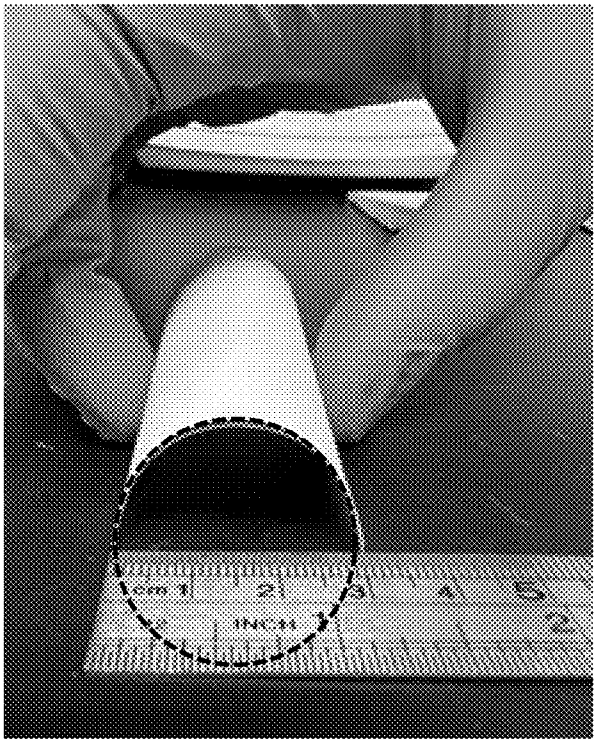
Figure 1D:

FIGS. 1A through 1D provide a typical procedure for measuring the bending radius according to one embodiment of the disclosure. A solid electrolyte membrane with a size of 5.4 cm×5.4 cm and a thickness of 90 μm was initially prepared (FIG. 1A). A bending force was applied to the membrane and two opposite edges were approaching each other (FIG. 1B). The flexibility of the membrane was reflected by the distance between these two opposite edges, or by the bending radius (r) corresponding to the bent or curved membrane while the membrane has no observable wrinkles or cracks, as shown in FIG. 1C. Once the membrane was over-bent, the membrane had observable wrinkles or cracks as indicated by the arrow in FIG. 1D. A smaller value of the bending radius suggests a higher flexibility of the membrane. In one embodiment, the bending test is conducted with naked eyes or under a microscope or an optical magnifier.

Table 1 summarizes the bending radius (r) and strain ($\varepsilon_M$), and Li ion conductivity of SE membranes or sheets with different compositions.

Figure 2A:
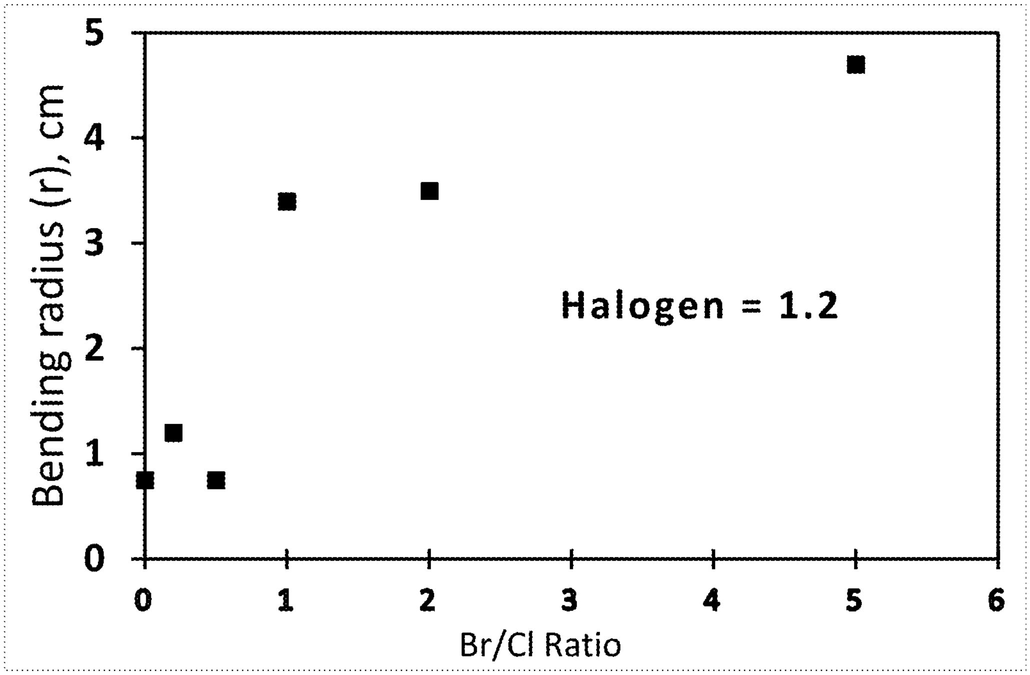
FIG. 2A shows a representative relationship between Br/Cl ratio and the bending radius for a compound with a formula of $Li_{5.8}PS_{4.8}Cl_aBr_b$ wherein a+b=1.2.
Figure 2B:
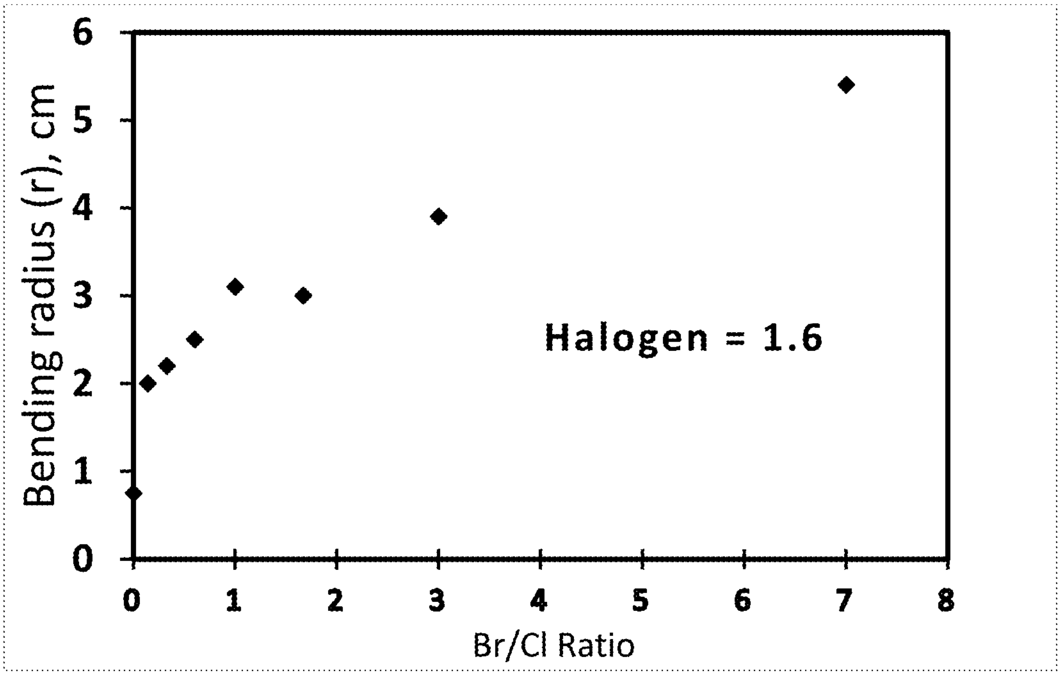
FIG. 2B shows a representative relationship between Br/Cl ratio and the bending radius for a compound with a formula of $Li_{5.4}PS_{4.4}Cl_aBr_b$ wherein a+b=1.6.
Figure 3:
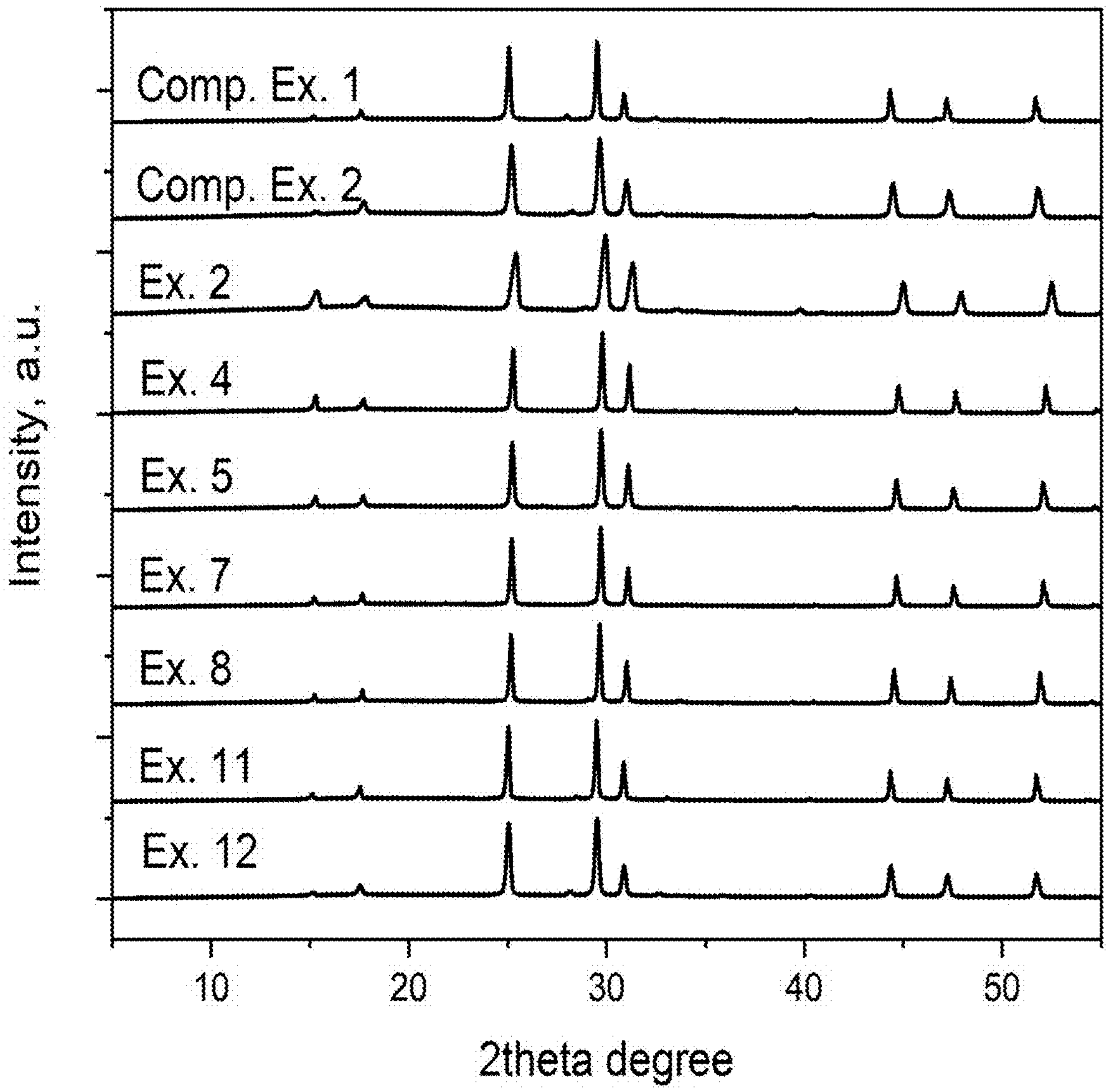
FIG. 3 shows X-ray diffraction (XRD) patterns of examples 2, 4, 8 and comparative examples 1 and 2.

FIG. 2A shows a representative relationship between Br/Cl ratio and the bending radius for an SE sheet or membrane with a formula of $Li_{5.8}PS_{4.8}Cl_aBr_b$, wherein the total molar fraction of halogens, i.e., a+b, is 1.2. FIG. 2B shows a representative relationship between Br/Cl ratio and the bending radius for an SE sheet or membrane with a formula of $Li_{5.4}PS_{4.4}Cl_aBr_b$, wherein the total molar fraction of halogens, i.e., a+b, is 1.6. Both figures clearly show that when the Br/Cl molar ratio is no more than 4, the membrane exhibits a better flexibility, i.e., a bending radius (r) of no bigger than 4 cm and a bending strain of no less than 0.1%.

As also shown in Table 1, the SE may comprise other elements including without limitation O and Ge. In one embodiment, the SE comprises no Br.

TABLE 1

Bending radius (r) and strain ($\varepsilon_M$), and Li ion conductivity of SE membranes or sheets with different compositions

| | SE composition | Br/Cl | r (cm) | $\varepsilon_M$ (%) | Li ion conductivity (of the sheet [a]) (mS/cm) |
|---|---|---|---|---|---|
| Com. Example1 | $Li_{5.4}PS_{4.4}Cl_{0.2}Br_{1.4}$ | 7 | ~5.4 | 0.0833 | 0.9 |
| Com. Example2 | $Li_{5.8}PS_{4.8}Cl_{0.2}Br_{1.0}$ | 5 | ~4.7 | 0.0957 | 0.54 |
| Example 15 | $Li_{5.8}PS_{4.7}O_{0.1}Cl_{1.2}$ | 0 | <0.75 | >0.6 | 0.72 |
| Example 14 | $Li_{5.9}P_{0.9}Ge_{0.1}S_{4.8}Cl_{1.2}$ | 0 | <0.75 | >0.6 | 0.56 |
| Example 13 | $Li_{5.7}Na_{0.1}PS_{4.8}Cl_{1.2}$ | 0 | <0.75 | >0.6 | 0.51 |
| Example 12 | $Li_{5.4}PS_{4.4}Cl_{0.4}Br_{1.2}$ | 3 | ~3.9 | 0.1154 | 0.9 |
| Example 11 | $Li_{5.8}PS_{4.8}Cl_{0.4}Br_{0.8}$ | 2 | ~3.5 | 0.1286 | 0.62 |
| Example 10 | $Li_{5.4}PS_{4.4}Cl_{0.6}Br_{1.0}$ | 1.67 | ~3.0 | 0.15 | 0.9 |
| Example 9 | $Li_{5.4}PS_{4.4}Cl_{0.8}Br_{0.8}$ | 1 | ~3.1 | 0.1452 | 1.3 |
| Example 8 | $Li_{5.8}PS_{4.8}Cl_{0.6}Br_{0.6}$ | 1 | ~3.4 | 0.1324 | 0.53 |
| Example 7 | $Li_{5.4}PS_{4.4}Cl_{1.0}Br_{0.6}$ | 0.6 | ~2.5 | 0.18 | 1.0 |
| Example 6 | $Li_{5.4}PS_{4.4}Cl_{1.2}Br_{0.4}$ | 0.33 | ~2.2 | 0.2045 | 0.5 |
| Example 5 | $Li_{5.8}PS_{4.8}Cl_{0.8}Br_{0.4}$ | 0.5 | <0.75 | >0.6 | 0.6 |
| Example 4 | $Li_{5.8}PS_{4.8}Cl_{1.0}Br_{0.2}$ | 0.2 | ~1.2 | 0.375 | 0.54 |
| Example 3 | $Li_{5.4}PS_{4.4}Cl_{1.4}Br_{0.2}$ | 0.14 | ~2 | 0.225 | 0.7 |
| Example 2 | $Li_{5.4}PS_{4.4}Cl_{1.6}$ | 0 | <0.75 | >0.6 | 0.6 |
| Example 1 | $Li_{5.8}PS_{4.8}Cl_{1.2}$ | 0 | <0.75 | >0.6 | 0.5 |

[a] the sheets are prepared using 1.25 wt % binder 1, which is an acrylate binder.

Figure 4:
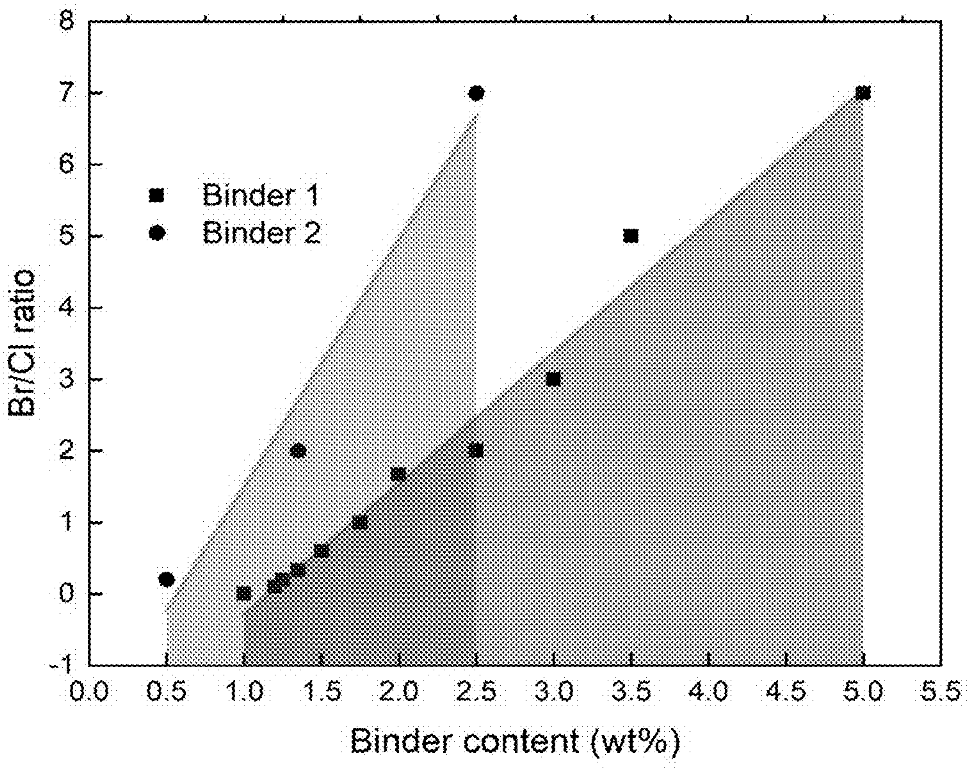
FIG. 4 shows flexible SEs prepared with two representative binders at different Br/Cl ratios.

As shown in FIG. 4, the flexible SE membranes (with a bending strain of at least 0.1%) were obtained. It clearly shows that increasing polymer binder amount would make the SE membrane flexible. As for the binder 1, the curve fitting leads to an equation, $$Br/Cl=183x-2.11 \quad \text{(Equation I)},$$

wherein x is the weight percentage of the binder in the SE membrane.

Equation I describes the highest Br/Cl ratio that leads to flexibility of the SE membranes at different weight percentage of the binder 1. All compositions falling on the equation or below the equation leads to flexible SE membranes.

As for the binder 2, the curve fitting leads to an equation, $$Br/Cl=345x-1.94 \quad \text{(Equation II)},$$

wherein x is the weight percentage of the binder 2 in the SE membrane.

Equation II describes the highest Br/Cl ratio that leads to flexibility of the SE membranes at different weight percentage of the binder 2.

It clearly demonstrates that the structure of binder plays an important role in determining the flexibility of the SE membranes.

The solid electrolyte materials were prepared following the steps in Example 1. The solid electrolyte particles were mixed with a binder 2, PTFE, to form mixtures, each of which was then shaped into a solid electrolyte membrane with a desirable thickness by calendaring. The binder's weight percentage ranges from 0.5 wt % to 7 wt % in the mixture. The flexibility of the membranes is summarized in Table 2.

TABLE 2

Bending radius (r) and strain ($\varepsilon_M$) of SE membranes or sheets with different compositions

| | SE composition | Br/Cl | r (cm) | $\varepsilon_M$ (%) |
|---|---|---|---|---|
| Example 1 | $Li_{5.8}PS_{4.8}Cl_{1.2}$ | 0 | <0.75 | >0.6 |
| Example 11 | $Li_{5.8}PS_{4.8}Cl_{0.4}Br_{0.8}$ | 2 | <0.75 | >0.6 |
| Com. Example1 | $Li_{5.4}PS_{4.4}Cl_{0.2}Br_{1.4}$ | 7 | <0.75 | >0.6 |

In one aspect of the present disclosure, an electrolyte membrane comprises:

a) a sulfide solid electrolyte with a formula $Li_xM1_yM2_zP_{1-p}M3_pS_{6-a-b-q}O_qCl_aBr_b$ (Formula I), wherein $4\leq x\leq 8$, $0\leq y<1$, $0\leq z<1$, $0\leq p<1$, $0\leq q<1$, $0<a\leq 2$, $0\leq b<2$, $0<6-a-b-q<6$, $0<1-p\leq 1$, $0\leq b/a\leq 20$, and wherein M1 is at least one element of Group 1 or Group 11 other than H or Li of the periodic table, M2 is at least one element of Group 2 of the periodic table, and M3 is at least one element of Group 14 of the periodic table; and
b) a binder with a weight percentage in a range from 0.05 wt % to 10 wt % in the flexible electrolyte membrane, wherein the electrolyte membrane has a bending strain ($\varepsilon_M$) of no less than 0.1%, and wherein the bending strain is calculated according to the formula:

$$\varepsilon_M=h/(2r),$$

where h is thickness of the membrane and r is a bending radius of the membrane achieved without any damage to the membrane.

In a second aspect, the b/a has a value no higher than a threshold value determined by an equation.

In a third aspect according to the second aspect, the equation is b/a=183 x−2.11 (Equation I) for an acrylate binder, wherein x refers to weight percentage of the acrylate binder in the electrolyte membrane.

In a fourth aspect according to the second aspect, the equation is b/a=345 x−1.94 (Equation II) for a PTFE binder, wherein x refers to weight percentage of the PTFE binder in the electrolyte membrane.

In a fifth aspect according to the first aspect, the electrolyte membrane has a lithium-ion conductivity in a range from 0.05 to 20 mS/cm.

In a sixth aspect according to the first aspect, the electrolyte membrane has a lithium-ion conductivity of no less than 0.5 mS/cm.

In a seventh aspect according to the first aspect, the electrolyte membrane has a thickness in a range from 5 μm to 300 μm.

In an eighth aspect according to the first aspect, the electrolyte membrane further comprises a non-woven fabric or an equivalent as a scaffold layer.

In a nineth aspect according to the first aspect, Formula I is selected from the group consisting of:

a) $Li_xPS_{6-a-b}Cl_aBr_b$, where 4≤x≤8, 0<a≤2, 0≤b<2, 0<6−a−b<6;
b) $Li_xM1_yPS_{6-a-b}Cl_aBr_b$, where 4≤x≤8, 0<y<1, 0<a≤2, 0≤b<2, 0<6−a−b<6;
c) $Li_xM2_zPS_{6-a-b}Cl_aBr_b$, where 4≤x≤8, 0<z≤1, 0<a≤2, 0≤b<2, 0<6−a−b<6;
d) $Li_xP_{1-p}M3_pS_{6-a-b}Cl_aBr_b$, where 4≤x≤8, 0<p<1, 0<a≤2, 0≤b<2, 0<6−a−b<6, 0<1−p<1;
e) $Li_xPS_{6-a-b-q}O_qCl_aBr_b$, where 4≤x≤8, 0<q≤1, 0<a≤2, 0≤b<2, 0<6−a−b−q<6;
f) $Li_xM1_yPS_{6-a-b-q}O_qCl_aBr_b$, where 4≤x≤8, 0<y<1, 0<q<1, 0<a≤2, 0≤b<2, 0<6−a−b−q<6;
g) $Li_xM2_zPS_{6-a-b-q}O_qCl_aBr_b$, where 4≤x≤8, 0<z<1, 0≤q<1, 0<a≤2, 0≤b<2, 0<6−a−b−q<6; and
h) $Li_xP_{1-p}M3_pS_{6-a-b-q}O_qCl_aBr_b$, where 4≤x≤8, 0<p<1, 0<q<1, 0<a≤2, 0≤b<2, 0<6−a−b−q<6, 0<1−p<1.

In a tenth aspect according to the first aspect, the total molar amount of Br and Cl is less than 2, i.e., a+b≤2.

In an eleventh aspect according to the first aspect, the sulfide solid electrolyte has a formula selected from the group consisting of: $Li_{5.8}PS_{4.7}O_{0.1}Cl_{1.2}$, $Li_{5.9}P_{0.9}Ge_{0.1}S_{4.8}Cl_{1.2}$, $Li_{5.7}Na_{0.1}PS_{4.8}Cl_{1.2}$, $Li_{5.4}PS_{4.4}Cl_{0.4}Br_{1.2}$, $Li_{5.8}PS_{4.8}Cl_{0.4}Br_{0.8}$, $Li_{5.4}PS_{4.4}Cl_{0.6}Br_{1.0}$, $Li_{5.4}PS_{4.4}Cl_{0.8}Br_{0.8}$, $Li_{5.4}PS_{4.4}Cl_{0.8}Br_{0.8}$, $Li_{5.8}PS_{4.8}Cl_{0.6}Br_{0.6}$, $Li_{5.4}PS_{4.4}Cl_{1.0}Br_{0.6}$, $Li_{5.4}PS_{4.4}Cl_{1.2}Br_{0.4}$, $Li_{5.8}PS_{4.8}Cl_{0.8}Br_{0.4}$, $Li_{5.8}PS_{4.8}Cl_{1.0}Br_{0.2}$, and $Li_{5.4}PS_{4.4}Cl_{1.4}Br_{0.2}$ In a twelfth aspect of the present disclosure, an all solid-state battery comprises the electrolyte membrane as disclosed herein.

In a thirteenth aspect of the present disclosure, the all solid-state battery further comprises a cathode comprising a cathode electroactive material.

In a fourteenth aspect according to the thirteenth aspect, the cathode active material shows a redox reaction at a potential of 2 V or more vs Li/Li+ during operation of the all solid-state battery.

In a fifteenth aspect of the present disclosure, a method for preparing the electrolyte membrane comprises: mixing particles of the sulfide solid electrolyte and a polymer binder, resulting in a mixture.

In a sixteenth aspect according to the fifteenth aspect of the present disclosure, the particles of the sulfide solid electrolyte are synthesized by mixing raw precursor powders at a stoichiometric ratio in an inert atmosphere, followed by sintering at 400-700° C. for 4-24 hours and grinding, wherein the raw precursor powders comprise $Li_2S$, $Na_2S$, $P_2S_5$, LiCl, LiBr, $Li_2O$, and $GeS_2$.

In a seventeenth aspect according to the fifteenth aspect of the present disclosure, wherein the mixture comprises a solvent and the mixture is a slurry.

In an eighteenth aspect according to the seventeenth aspect of the present disclosure, the method further comprises:

a) coating the mixture onto a base followed by a vacuum drying at room temperature, wherein the base comprises a film and a non-woven fabric, leading to a dried coating attached to the non-woven fabric; and
b) peeling the dried coating off the film, thereby obtaining an electrolyte membrane comprising the dried coating and the non-woven fabric.

In a nineteenth aspect according to the eighteenth aspect of the present disclosure, the film in the base is a PET film and the non-woven fabric is made of polyester with a thickness around 10 μm.

In a twentieth aspect according to the fifteenth aspect of the present disclosure, the mixture is substantially free of solvent and the mixture is shaped into a membrane by calendaring.

What is claimed is:

1. An electrolyte membrane comprising:

a) a sulfide solid electrolyte with a formula $Li_xM1_yM2_zP_{1-p}M3_pS_{6-a-b-q}O_qCl_aBr_b$ (Formula I), wherein 4≤x≤8, 0≤y<1, 0≤z<1, 0≤p<1, 0≤q<1, 0<a≤2, 0≤b<2, 0<6-a-b-q<6, 0<1-p≤1, 0≤b/a≤20, and wherein M1 is at least one element of Group 1 or Group 11 other than H or Li of the periodic table, M2 is at least one element of Group 2 of the periodic table, and M3 is at least one element of Group 14 of the periodic table; and
b) an acrylate binder, wherein the electrolyte membrane has a bending strain ($\varepsilon_M$) of no less than 0.1%, and wherein the bending strain is calculated according to the formula:

$$\varepsilon_M = h/(2r),$$

where h is thickness of the membrane and r is a bending radius of the membrane achieved without any observable damage to the membrane, wherein the b/a has a value no higher than a threshold value determined by 183 x−2.11 (Equation I), wherein x refers to weight percentage of the acrylate binder in the electrolyte membrane and has a value in a range from 0.05 wt % to 10 wt % therein.

2. The electrolyte membrane of claim 1, wherein the weight percentage of the acrylate binder is greater than 1.0 wt % and no greater than 10 wt %.

3. The electrolyte membrane of claim 1, wherein b>0.

4. The electrolyte membrane of claim 1, wherein the electrolyte membrane has a lithium-ion conductivity in a range from 0.05 to 20 mS/cm.

5. The electrolyte membrane of claim 1, wherein the electrolyte membrane has a lithium-ion conductivity of no less than 0.5 mS/cm.

6. The electrolyte membrane of claim 1, wherein the electrolyte membrane has a thickness in a range from 5 μm to 300 μm.

7. The electrolyte membrane of claim 1, further comprising a non-woven fabric as a scaffold layer.

8. The electrolyte membrane of claim 1, wherein Formula I is selected from the group consisting of:

a) $Li_xPS_{6-a-b}Cl_aBr_b$, where 4≤x≤8, 0<a≤2, 0≤b<2, 0<6−a−b<6;
b) $Li_xM1_yPS_{6-a-b}Cl_aBr_b$, where 4≤x≤8, 0<y<1, 0<a≤2, 0≤b<2, 0<6−a−b<6;

c) $Li_xM2_zPS_{6-a-b}Cl_aBr_b$, where 4≤x≤8, 0<z≤1, 0<a≤2, 0≤b<2, 0<6−a−b<6;

d) $Li_xP_{1-p}M3_pS_{6-a-b}Cl_aBr_b$, where 4≤x≤8, 0<p<1, 0<a≤2, 0≤b<2, 0<6−a−b<6, 0<1−p<1;

e) $Li_xPS_{6-a-b-q}O_qCl_aBr_b$, where 4≤x≤8, 0<q≤1, 0<a≤2, 0≤b<2, 0<6−a−b−q<6;

f) $Li_xM1_yPS_{6-a-b-q}O_qCl_aBr_b$, where 4≤x≤8, 0<y<1, 0<q<1, 0<a≤2, 0≤b<2, 0<6−a−b−q<6;

g) $Li_xM2_zPS_{6-a-b-q}O_qCl_aBr_b$, where 4≤x≤8, 0<z<1, 0≤q<1, 0<a≤2, 0≤b<2, 0<6−a−b−q<6; and h) $Li_xP_{1-p}M3_pS_{6-a-b-q}O_qCl_aBr_b$, where 4≤x≤8, 0<p<1, 0<q<1, 0<a≤2, 0≤b<2, 0<6−a−b−q<6, 0<1−p<1.

9. The electrolyte membrane of claim 1, wherein a+b≤2.

10. The electrolyte membrane of claim 1, wherein the sulfide solid electrolyte has a formula selected from the group consisting of: group consisting of: $Li_{5.8}PS_{4.7}O_{0.1}Cl_{1.2}$, $Li_{5.9}P_{0.9}Ge_{0.1}S_{4.8}Cl_{1.2}$, $Li_{5.7}Na_{0.1}PS_{4.8}Cl_{1.2}$, $Li_{5.4}PS_{4.4}Cl_{0.4}Br_{1.2}$, $Li_{5.8}PS_{4.8}Cl_{0.4}Br_{0.8}$, $Li_{5.4}PS_{4.4}Cl_{0.6}Br_{1.0}$, $Li_{5.4}PS_{4.4}Cl_{0.8}Br_{0.8}$, $Li_{5.4}PS_{4.4}Cl_{0.8}Br_{0.8}$, $Li_{5.8}PS_{4.8}Cl_{0.6}Br_{0.6}$, $Li_{5.4}PS_{4.4}Cl_{1.0}Br_{0.6}$, $Li_{5.4}PS_{4.4}Cl_{1.2}Br_{0.4}$, $Li_{5.8}PS_{4.8}Cl_{0.8}Br_{0.4}$, $Li_{5.8}PS_{4.8}Cl_{1.0}Br_{0.2}$, and $Li_{5.4}PS_{4.4}Cl_{1.4}Br_{0.2}$.

11. An all solid-state battery comprising the electrolyte membrane of claim 1.

12. The all solid-state battery of claim 11, further comprising a cathode comprising a cathode electroactive material.

13. The all solid-state battery of claim 12, wherein the cathode active material shows a redox reaction at a potential of 2 V or more vs Li/Li+ during operation of the all solid-state battery.

14. A method for preparing the electrolyte membrane of claim 1, comprising: mixing particles of the sulfide solid electrolyte and the acrylate binder, resulting in a mixture.

15. The method of claim 14, wherein the particles of the sulfide solid electrolyte are synthesized by mixing raw precursor powders at a stoichiometric ratio in an inert atmosphere, followed by sintering at 400-700° C. for 4-24 hours and grinding, wherein the raw precursor powders are selected from the group consisting of $Li_2S$, $Na_2S$, $P_2S_5$, LiCl, LiBr, $Li_2O$, $GeS_2$, and combinations thereof.

16. The method of claim 14, wherein the mixture comprises a solvent and the mixture is a slurry.

17. The method of claim 16, further comprising:

a) coating the mixture onto a base followed by a vacuum drying at room temperature, wherein the base comprises a film and a non-woven fabric, leading to a dried coating attached to the non-woven fabric; and b) peeling the dried coating off the film, thereby obtaining an electrolyte membrane comprising the dried coating and the non-woven fabric.

18. The method of claim 17, wherein the film in the base is a PET film and the non-woven fabric is made of polyester with a thickness around 10 μm.

19. The method of claim 14, wherein the mixture is substantially free of solvent and the mixture is shaped into a membrane by calendaring.

* * * * *